United States Patent [19]

Heath et al.

[11] Patent Number: 5,491,804

[45] Date of Patent: Feb. 13, 1996

[54] METHOD AND APPARATUS FOR AUTOMATIC INITIALIZATION OF PLUGGABLE OPTION CARDS

[75] Inventors: Chester A. Heath; John K. Langgood, both of Boca Raton, Fla.; Ronald E. Valli, Pittsburgh, Pa.

[73] Assignee: International Business Machines Corp., Armonk, N.Y.

[21] Appl. No.: 637,411

[22] Filed: Jan. 4, 1991

Related U.S. Application Data

[63] Continuation of Ser. No. 296,387, Jan. 6, 1989, Pat. No. 5,038,320, which is a continuation of Ser. No. 21,391, Mar. 13, 1987, abandoned.

[51] Int. Cl.[6] .............................. G06F 13/00; G06F 7/04
[52] U.S. Cl. .......................... 395/275; 395/575; 395/700; 371/11.1; 364/DIG. 2; 364/948.5; 364/944.61; 364/975.2; 364/976.4; 364/945; 364/929.5; 364/929.2
[58] Field of Search ................................ 395/275, 325, 395/500, 575, 700, 725, 800; 371/7, 11.1, 11.2, 11.3, 66; 340/825.06, 825.07, 825.52

[56] References Cited

U.S. PATENT DOCUMENTS

| 3,480,914 | 11/1969 | Schlaeppi | 364/200 |
|---|---|---|---|
| 3,510,843 | 5/1970 | Bennett | 364/200 |

(List continued on next page.)

FOREIGN PATENT DOCUMENTS

| 0041406 | 9/1981 | European Pat. Off. . |
|---|---|---|
| 0171073 | 7/1984 | European Pat. Off. . |
| 0121381 | 10/1984 | European Pat. Off. . |
| 0136178 | 3/1985 | European Pat. Off. . |
| 0182044 | 5/1986 | European Pat. Off. . |
| 0179981 | 7/1986 | European Pat. Off. . |
| 0200198 | 11/1986 | European Pat. Off. . |
| 3508648 | 9/1986 | Germany . |
| 54-73531 | 6/1979 | Japan . |
| 55-56235 | 4/1980 | Japan . |
| 57-161950 | 10/1982 | Japan . |
| 2101370 | 1/1983 | United Kingdom . |
| 2137382 | 10/1984 | United Kingdom . |
| 2166893 | 5/1986 | United Kingdom . |
| 2175716 | 12/1986 | United Kingdom . |

OTHER PUBLICATIONS

JP Abstract vol. 9, No. 90 (P–378) (1913) Aug. 1985.
JP Abstract vol. 9, No. 239 (P–391) (1962), Sep., 1985.
JP Abstract vol. 10, No. 256 (P–493) (2312) Sep., 1986.

(List continued on next page.)

*Primary Examiner*—Paul V. Kulik
*Attorney, Agent, or Firm*—Winfield J. Brown, Jr.; Michael J. Buchenhorner

[57] ABSTRACT

A data processing system includes a planar board having a central processing unit (CPU), a main memory unit, and input/output (I/O) sockets or slots, each adapted to receive a selected one of a plurality of different and/or similar option cards. Each card contains (or is connected to) and controls a respective peripheral device; and each card is pre-wired with an ID value corresponding to its card type. Software programmable option registers on each card store parameters such as designated default (or alternate) address information, priority levels, and other system resource parameters. A setup routine, during initial power-on, retrieves and stores the appropriate parameters in the I/O cards and also in slot positions in main memory, one position being assigned to each slot on the board. Each slot position is adapted to hold the parameters associated with the card inserted in its respective slot and the card ID value. That portion of main memory containing the slot positions is adapted to maintain the parameter and ID information by means of battery power when system power fails or is disconnected, i.e., a nonvolatile memory portion. Subsequent power-on routines are simplified by merely transferring parameters from the table to the card option registers if the status of all the slots has not not changed since the last power-down, system reset, or channel reset.

48 Claims, 7 Drawing Sheets

U.S. PATENT DOCUMENTS

| | | | |
|---|---|---|---|
| 3,573,741 | 4/1971 | Gavril | 364/200 |
| 3,818,447 | 6/1974 | Craft | 340/172.5 |
| 4,003,033 | 1/1977 | O'Keefe | 364/200 |
| 4,015,244 | 3/1977 | Simpson | 364/200 |
| 4,025,903 | 5/1977 | Kaufman | 364/200 |
| 4,027,108 | 5/1977 | Moorehead | 364/200 |
| 4,070,704 | 1/1978 | Calle | 364/200 |
| 4,075,693 | 2/1978 | Fox | 364/200 |
| 4,155,117 | 5/1979 | Mitchell, Jr. | 364/200 |
| 4,177,511 | 12/1979 | Taddei | 364/200 |
| 4,191,996 | 3/1980 | Chesley | 364/200 |
| 4,236,207 | 11/1980 | Rado | 364/200 |
| 4,253,087 | 2/1981 | Saal | 340/147 R |
| 4,253,144 | 2/1981 | Bellamy | 364/200 |
| 4,254,463 | 3/1981 | Busby | 364/200 |
| 4,268,901 | 5/1981 | Subrizi | 364/200 |
| 4,293,924 | 10/1981 | Struger | 364/900 |
| 4,303,993 | 12/1981 | Panepinto | 365/230 |
| 4,314,354 | 2/1982 | Felder | 364/900 |
| 4,335,426 | 6/1982 | Maxwell | 364/200 |
| 4,356,475 | 10/1982 | Neumann | 340/521 |
| 4,360,870 | 11/1982 | McVey | 364/200 |
| 4,363,094 | 12/1982 | Kaul | 364/200 |
| 4,373,181 | 2/1983 | Chisholm | 364/200 |
| 4,400,775 | 8/1983 | Nozaki | 364/200 |
| 4,432,049 | 2/1984 | Shaw | 364/200 |
| 4,437,157 | 3/1984 | Witalka | 364/200 |
| 4,442,504 | 4/1984 | Dummermuth | 364/900 |
| 4,454,596 | 6/1984 | Wunsch | 364/900 |
| 4,458,357 | 7/1984 | Weymouth | 377/2 |
| 4,491,913 | 1/1985 | Calvignac | 364/200 |
| 4,509,113 | 4/1985 | Heath | 364/200 |
| 4,514,728 | 4/1985 | Ahuja | 340/825.5 |
| 4,521,847 | 6/1985 | Ziehm | 371/7 X |
| 4,556,953 | 12/1985 | Caprio | 364/900 |
| 4,562,535 | 12/1985 | Vincent | 364/200 |
| 4,563,736 | 1/1986 | Boudreau | 364/200 |
| 4,571,676 | 2/1986 | Mantellina | 364/200 |
| 4,578,773 | 3/1986 | Desai | 364/900 |
| 4,589,063 | 5/1986 | Shah | 364/200 |
| 4,604,690 | 8/1986 | Crabtree | 364/200 |
| 4,622,633 | 11/1986 | Ceccon | 364/200 |
| 4,626,634 | 12/1986 | Brahm | 379/28 |
| 4,633,392 | 12/1986 | Vincent | 364/200 |
| 4,654,857 | 3/1987 | Samson | 371/68 |
| 4,660,141 | 4/1987 | Ceccon | 364/200 |
| 4,670,855 | 6/1987 | Caprio | 364/900 |
| 4,701,878 | 10/1987 | Gunkel | 364/900 |
| 4,713,834 | 12/1987 | Brahm | 379/28 |
| 4,718,038 | 1/1988 | Yoshida | 364/900 |
| 4,750,136 | 6/1988 | Arpin | 364/200 X |
| 4,760,553 | 7/1988 | Buckley | 364/900 |
| 4,787,025 | 11/1988 | Cheselka | 364/200 |
| 4,787,028 | 11/1988 | Finfrock | 364/900 X |
| 4,787,030 | 11/1988 | Harter | 364/200 |
| 4,868,783 | 9/1989 | Anderson | 364/900 |
| 4,870,704 | 9/1989 | Matelan | 364/200 |
| 5,014,193 | 5/1991 | Garner et al. | 395/575 |
| 5,038,320 | 8/1991 | Heath et al. | 364/900 |
| 5,056,060 | 10/1991 | Fitch et al. | 364/900 |

OTHER PUBLICATIONS

IBM TDB vol. 16, No. 1, Jun., 1973, Program Controlled I/O Address Assignment.

IBM TDB vol. 20, No. 7, Dec., 1977, Input/Output Device Address Recognition Mechanism.

IBM TDB vol. 20, No. 8, Jan., 1978, Initial Microprogram Load By Blocks Via Cycle Steal.

IBM TDB vol. 22, No. 2, Jul., 1979, Even/Odd Addresses To Allow Device Adapter Sharing By More Than One Processor.

IBM TDB vol. 22, No. 3, Aug., 1979, Programmable Idenitification For I/O Devices.

IBM TDB vol. 22, No. 5, Oct., 1979, Satellite Station Address Assignment Method.

IBM TDB vol. 22, No. 10, Mar. 1980, Automatic Module Detection.

IBM TDB vol. 23, No. 8, Jan. 1981, Dynamic Device Address Assignment Mechanism.

IBM TDB vol. 27, No. 1B, Jun. 1984, Automatic Domain Configuration Mechanism For a Multi-Device I/O Controller.

IBM TDB vol. 27, No. 2, Jul. 1984, Input/Output Channel Address Assignment Mechanism.

Interfacing to the IBM Personal Computer by Lewis C. Eggebrecht Chapter 12 (Published 1983 by H. W. Sams & Co., Inc.).

Wescon Technical Paper by DeHart, A Standard Portocol For Host Computer-Peripheral Interface Allows Upgrading To The Latest Mass Storage Devices (Oct. 30 Nov. 2, 1984).

EDN Magazine vol. 26, No. 3 (Boston, Feb. 1981) Interrogation Tells uP Which Boards Are Present.

New Electronics, No. 14 Jul., 1986, p. 19, Geographic Addressing With Multibus II (Budszinski).

Electronic Design, Sep. 3, 1981, pp. 141–156, several articles, "Functional Architecture threatens central CPUs", etc.

Paper in Euromicro, Input/Output Control of IBM System/370 Model 125 Through Dedicated Input/Output Processors, by Assmuth et al, pp. 24–40.

METHOD AND APPARATUS FOR AUTOMATIC INITIALIZATION OF PLUGGABLE OPTION CARDS

This application is a continuation of 07/296,387 filed Jan. 6, 1989, now U.S. Pat. No. 5,038,320, which is a continuation of 07/021,391 filed Mar. 13, 1987 which is now abandoned.

BACKGROUND OF THE INVENTION

Users of smaller computer systems typically do not have sophisticated programming skills, and user-transparent programmable parameter switches have been suggested to simplify configuration of the systems to the user's needs. However, the routines that are required to so configure such systems are complex, error prone, and time consuming. It is an objective of the present improvement to substantially reduce the time delay experienced by a user before he can do productive work on the system upon re-powering or resetting of the system after a power-down, so long as no cards are changed in, added to, or removed from the slots.

SUMMARY OF THE INVENTION

In the improved system, each card type is provided a unique ID, which value is hardwired on each card. A register is also provided on the card to store parameter data such as an address factor (to programmably change the I/O address space of the card where required), priority, status, and other system information providing for the efficient transfer of data between the system processor and the card, and between cards.

When two or more of the same card type are used in the system, parameter data may be used to permit use of the cards at different priority levels or to render redundant cards inactive.

One portion of main memory is provided with battery backup to power that portion when system power fails or is turned off. Positions in this nonvolatile portion of memory are provided (one for each I/O slot) to store the ID values of the cards inserted in the respective slots together with the respective card parameter data.

When the system is first configured and initialized, a complex routine is executed to create and/or fetch all of the parameter data required for the cards attached to the system, to resolve system resource conflicts and to store the data into the appropriate card registers and the memory slot positions.

However, if after a power-down, no change is made in the cards attached to the slots or in the slot positions of the cards, a simplified setup routine determines that no change has been made by comparing each card ID with the ID value stored in the respective slot position. Then the routine transfers the parameter data from the memory slot positions to the respective card registers; and the system is ready for normal operation.

After the system is configured and initialized, a feedback line is provided to signal the use of the select mechanism during normal operation. Routines are invoked to check the response of each card to given select resources to detect duplicate use of a select resource.

These and other features of the present improvement will be apparent from the following detailed description and accompanying drawings, in which.

DETAILED DESCRIPTION

Figure 1:
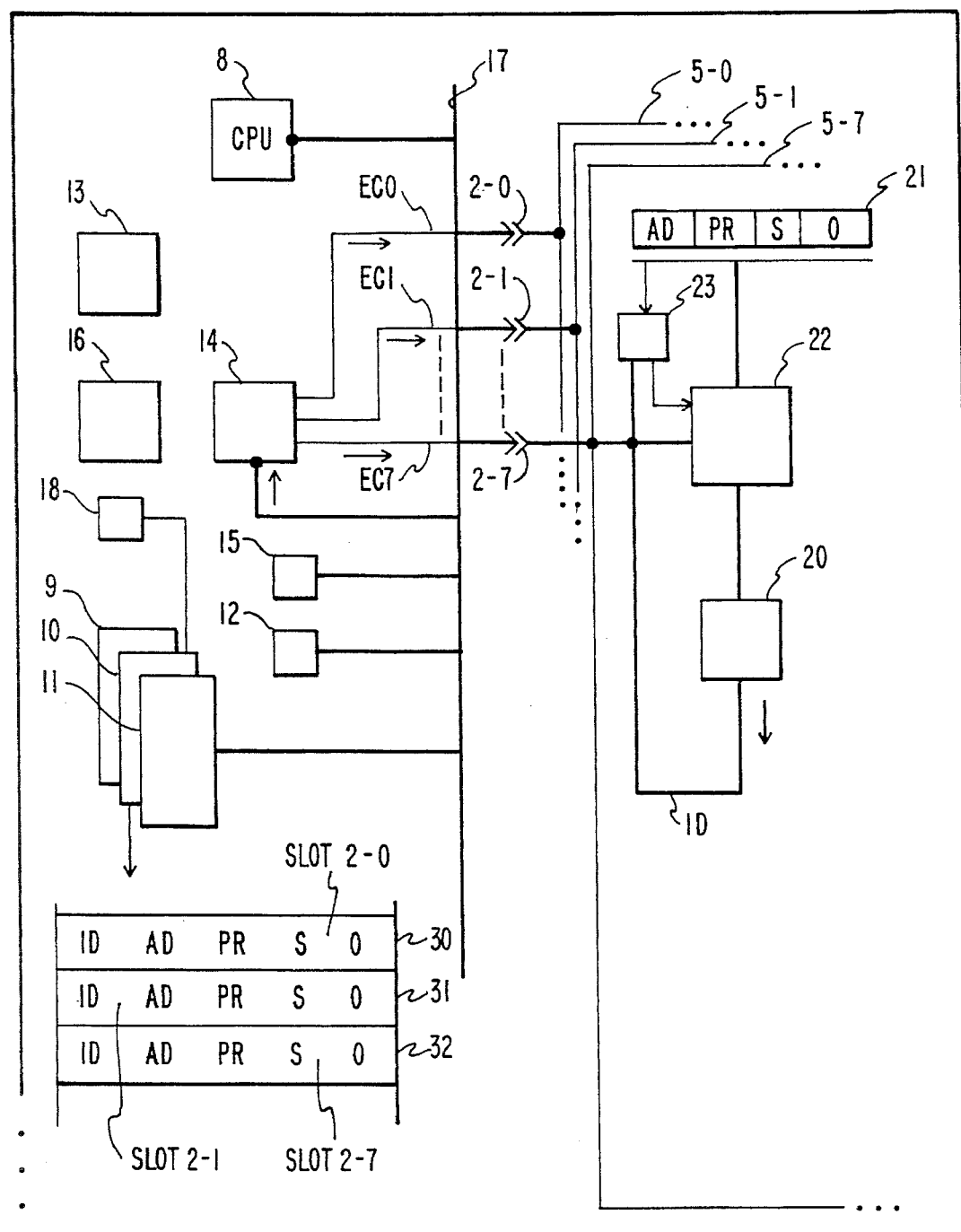
FIG. 1 is a fragmentary block diagram of the improved system.

FIG. 1 illustrates a preferred embodiment of the present improvement in the form of an integrated circuit desktop type computer system featuring user-transparent establishment of addressing and other variable system resource parameters for attached peripheral options. Thus the user is not burdened with having to set dip switches, follow complex setup procedures, etc. System resource conflicts are reduced or eliminated by reassigning of parameters. Other parameters include priority levels and a state bit which allows for coexistence of two identical option attachments.

Figure 2:
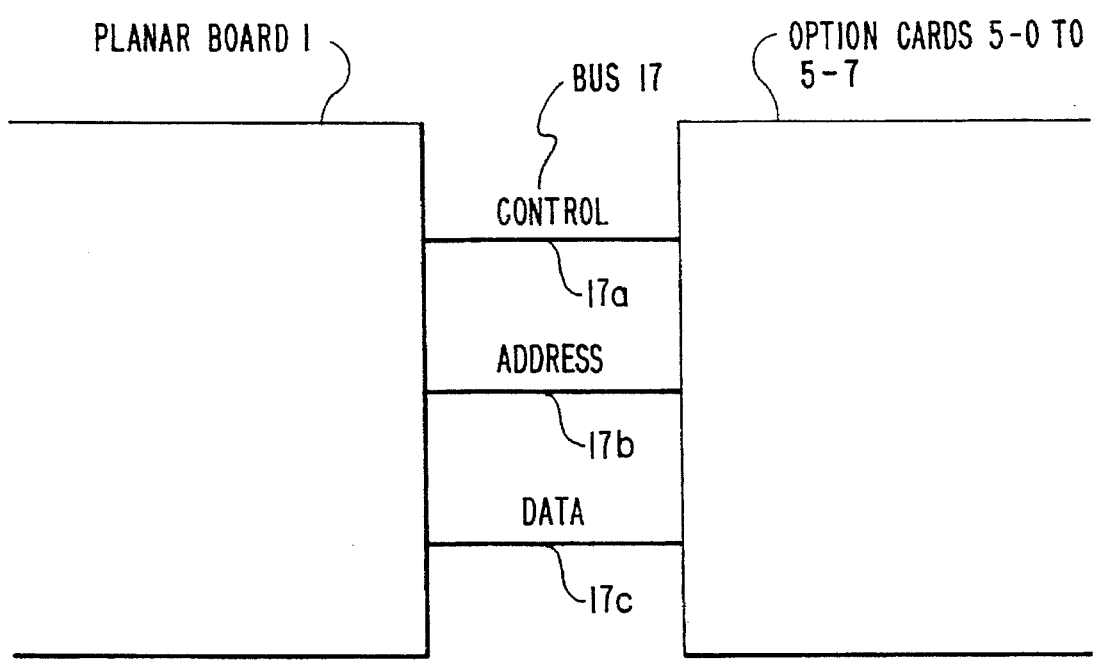
FIG. 2 illustrates the bus structure.

System board 1 contains plural sockets or slots 2-0 to 2-7 into which I/O option cards 5-0 to 5-7 may be interchangeably plugged. These cards control various types of peripheral devices (disk drives, printers, etc.) and add-on memory which are either integrally contained on respective cards or attached thereto via external connectors, not shown. Board 1 also contains elements of the central processing system, including a central processor unit (CPU) 8, random access memory (RAM) main memory modules 9, 10, 11, direct memory access (DMA) controls 12, timing controls 13, slot address decoder 14, whose function is described below, other logical elements not relevant to the present discussion indicated collectively at 15, power supply 16, and bus 17 which links the central processing elements with each other and with attached peripherals. Darkened portions of the bus represent plural address lines 17b, data lines 17c, and control lines 17a (FIG. 2).

A feature hereof is that slots 2-0 to 2-7 can be addressed by "slot address" signals on the address lines of bus 17 during setup routines, and cards residing in the slots can be separately addressed by "I/O address" signals on the address lines during normal program execution; where the slot addresses and I/O addresses are distinctly different values associated respectively with physical locations of the sockets and with the types of devices currently attached. Many different types of devices are each potentially attachable to any one of the few sockets of the system.

One of the memory modules, module 10 in the illustration, is nonvolatile, and stores information relative to each of the slots 2-0 to 2-7 and its associated card when the system is powered down. This module for example, may consist of an array of capacitive storage circuits, i.e., known complimentary metal-oxide silicon (CMOS) type semiconductor circuits, configured to operate under system power while the system is powered up and under battery power 18 in the absence of system power. Within this module, a separately addressable space is allocated to each slot, for storing certain information relative to the slot. As shown, this information includes an identity value ID, an addressing factor AD, a priority value PR, a state bit S, and other information O.

Figure 6:
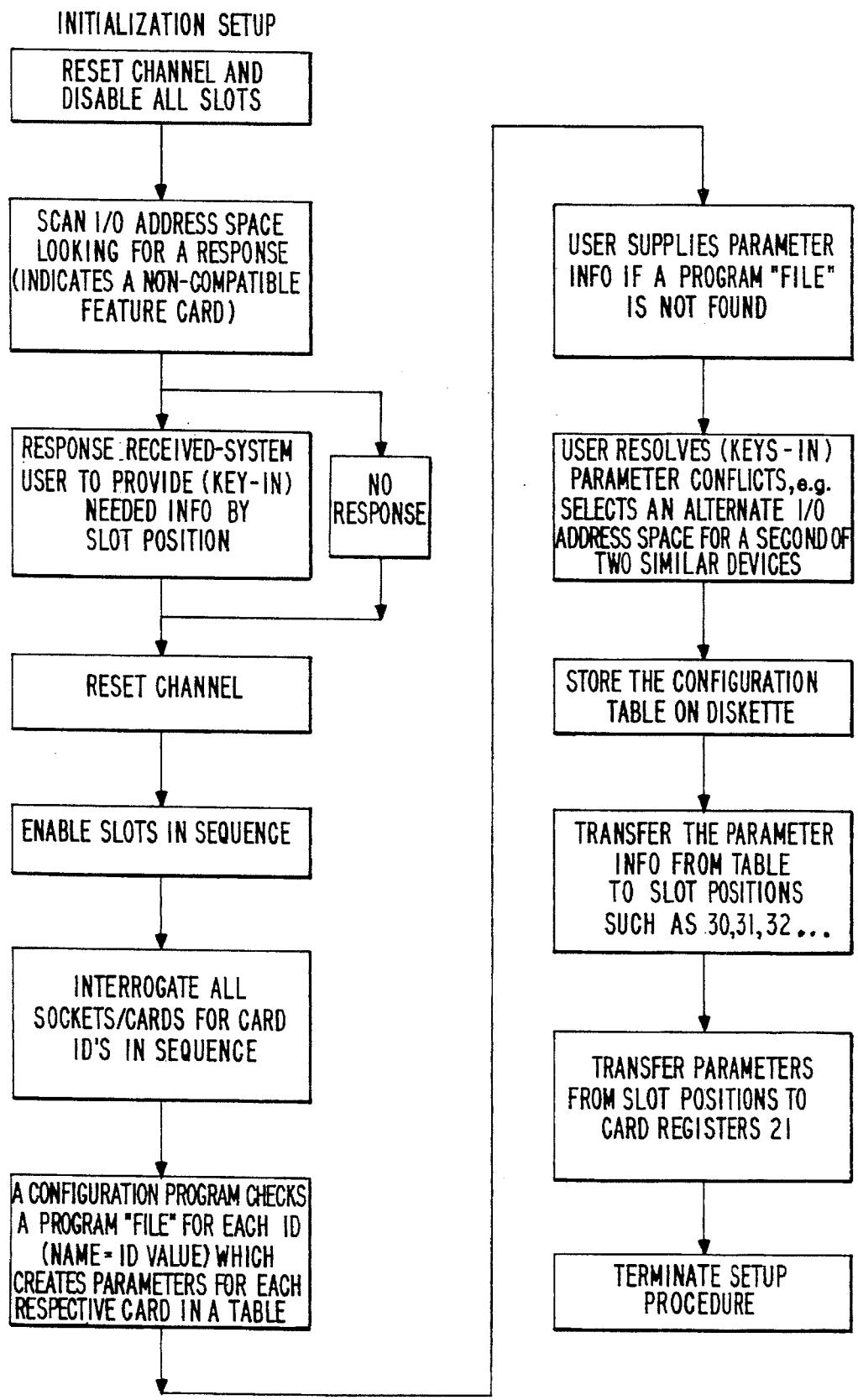
FIGS. 6 and 7 are flowcharts which illustrate briefly the setup routines used in the present system.

A feature to be described is the use of this information in the nonvolatile memory to speed up initialization (FIG. 7) of the system when the slot configuration has not changed since the last power-down, and thereby reduce the time the user has to wait to begin useful applications after operating the system power-on switch, not shown, or after system or channel reset. This difference in complexity and number of steps required is illustrated by FIGS. 6 (initialization) and 7 (POST).

Details of card 5-7 are indicated as representative of the relevant logical organizations of all cards to the extent required for describing the present improvement. Driver circuits 20 are pre-wired at manufacture, and under conditions described below transmit a set of identity signals ID which uniquely identify that card type and its respective peripheral device.

Register 21 stores parameter information for controlling communications between the card and the system, including the address factor AD, the priority value PR, the state bit S, and other information O described with respect to module 10. This information is set by the central system during power-up initialization (FIG. 6). A feature of the system is that, if slot conditions have not changed since the last power-down of the system, the information is simply transferred to register 21 from the nonvolatile memory 10 in a relatively fast operation (FIG. 7), whereas if slot conditions have changed the system is required to perform a lengthy program process (FIG. 6) to retrieve and/or develop some or all of the information and then transfer it to both memory 10 and the card register 21.

Control logic 22 and decode logic 23 control response of the card 5-7 to I/O addresses appearing on bus 17. When power is applied to the system, the cards are addressable initially only through their sockets, and a portion of the address bus. But after the power-up process, the value AD in register 21 controls decoder 23 to detect a default or alternate I/O address associated uniquely to the card type and unrelated to the socket location. Upon such detection, the priority value PR and state bit S in conjunction with control logic 22 determine when data may be exchanged between the card and the bus 17. One manner in which an AD value, the decoder 23 and logic 22 detect an I/O address is shown and described in Interfacing to the IBM Personal Computer by L. Eggebrecht published 1983 at pages 130, 131.

In operation, during its power-up sequence the central system individually addresses the option sockets, by sending respective "slot address" signals on the bus which are uniquely detected by decoder 14 and result in separate activation of setup (or enable card) lines EC0-EC7 extending to respective sockets 2-0 to 2-7 and through the sockets to attached cards 5-0 to 5-7. Upon activation of one such line, if the respective socket is vacant the hexadecimal value of FFFF is returned to the system which terminates further operation relative to that socket. However, if the socket contains a card, the activated line in conjunction with additional address signals on the bus 17 condition logic 22 on the respective card to cause drivers 20 to transmit the ID signals mentioned above which identify the respective card and device type. The system CPU compares the returned ID signals with the ID value stored in the location in memory 10 allocated to the respective slot, and sets an indication denoting whether the compared values are the same or different. This indication serves effectively as a branch condition for subsequent program processes which determine the action to be taken relative to the respective slot.

If the indication just mentioned represents a matching comparison, and conditions of all other slots have not changed, a subsequent program process will simply transfer the value of AD, PR, S, and O, which are currently stored in the associated location of memory 10 to the respective card for storage in its register 21. If the indication represents a non-matching comparison, and if the transmitted ID indicates that the respective slot contains a card, the processor 8 uses the transmitted ID and information gleaned from the other slots to retrieve and/or develop new AD, PR, S, and O values for the respective card using files describing card resource requirements and alternatives. After all card values are established, the values for each card are transferred in sequence first to the respective slot location in memory 10 and subsequently to the respective card register 21.

Mismatching comparisons occur when the state of the interrogated socket has been altered. The ID value stored in memory 10 relative to a socket which was vacant at last power-down is FFFF, and the ID value stored relative to a previously occupied socket is that of the card last occupying that slot. Thus, if a card is installed into a previously vacant slot or substituted for a card having a different ID, a mismatching comparison will occur causing the system to retrieve and/or develop new AD, PR, S, and O values for the responding card.

As noted above, the system cannot deal with mismatching indications until the states of all sockets have been ascertained. This is because the priority level, and in certain instances the address and state values, assigned to any card are relative to the cards in other slots. The address and state values are relative when two cards with the same identity ID are currently installed, either to provide redundant backup for device failure or to provide additional device capacity. In the latter instances, the state value can be used to place a backup device in an inactive state during normal system operation or the priority values can be used to allow both devices to operate fully but at different priority levels.

In the preferred embodiment, system information is stored in the eight slot positions (only three—30, 31, 32—are shown) of module 10 to accommodate up to eight feature cards 5-0 to 5-7. Each slot position is four bytes wide, twenty-eight bytes for seven feature cards. The card ID resides in the first two bytes and the switch (parameter) settings in the last two bytes. The corresponding ID and parameter data on each card resides in drivers 20 and register 21, respectively.

Figure 3:
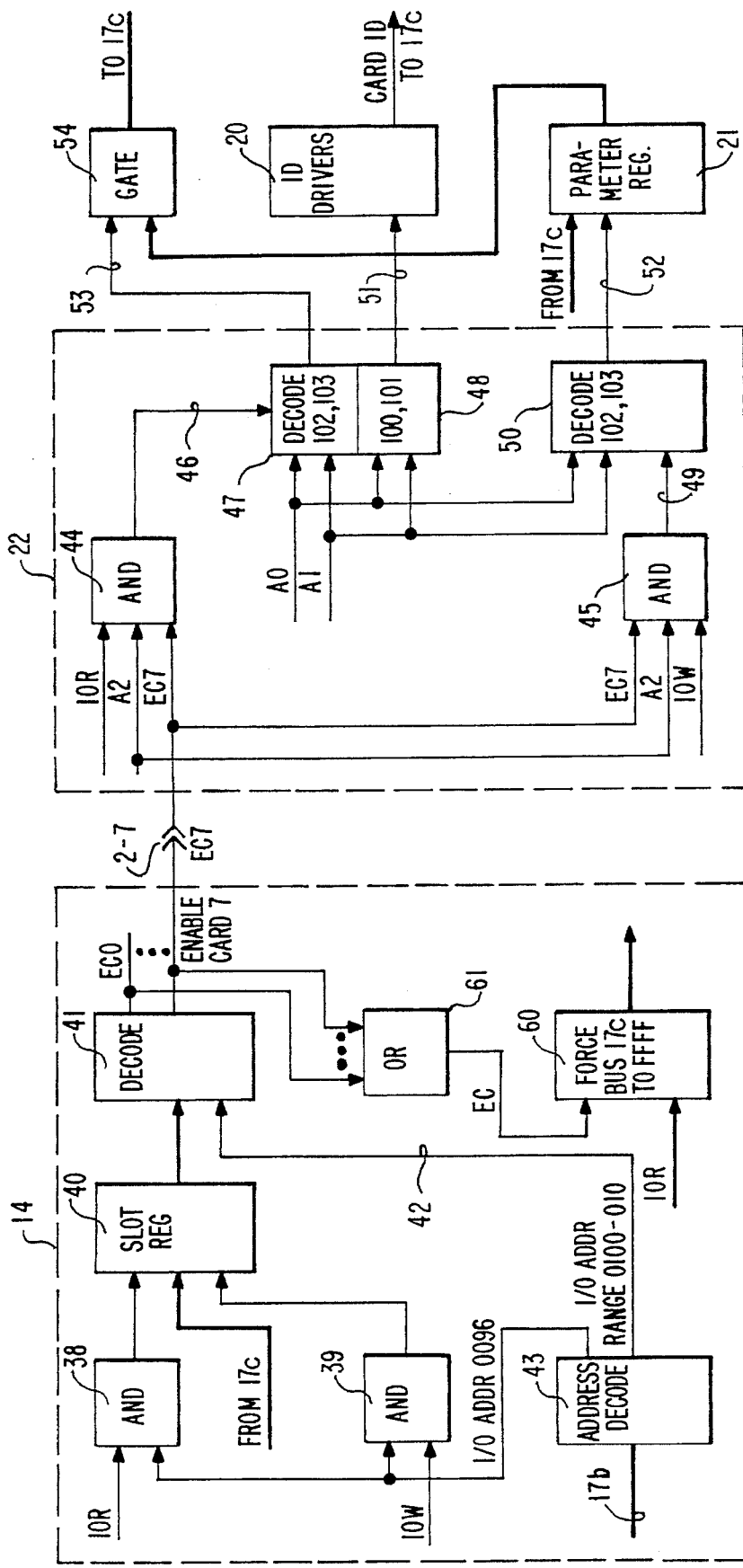
FIG. 3 show certain of the logic utilized by the setup routines.

FIG. 3 shows schematically certain of the logic on the board 1 and feature card 5-7 used during setup routines to read out a card ID and store parameters in the register 21. With respect to FIG. 3, the hexadecimal I/O address values assigned to certain of the components on each of the feature cards is as follows:

096—socket select value (one byte)

100, 101—ID drivers 20 (two bytes)

102, 103—parameter register 21 (two bytes)

These are "dummy" addresses since they are used by the processor 8 to access I/O cards and components via the slots during setup operations. The address 096 selects the logic (gates 38, 39) of slot address decoder 14 for storing the card select value into slot register 40 and also for reading out the value, i.e., during diagnosis. Address lines A0 and A1 of FIG. 3 form the lower address values 00, 01, 02, and 03 for selecting the components 20 and 21, while a logical 1 signal on address line A2 provides the most significant digit value of 1. A0, A1, and A2 are coupled to appropriate bit lines of address bus 17b, FIG. 2.

Figure 7:
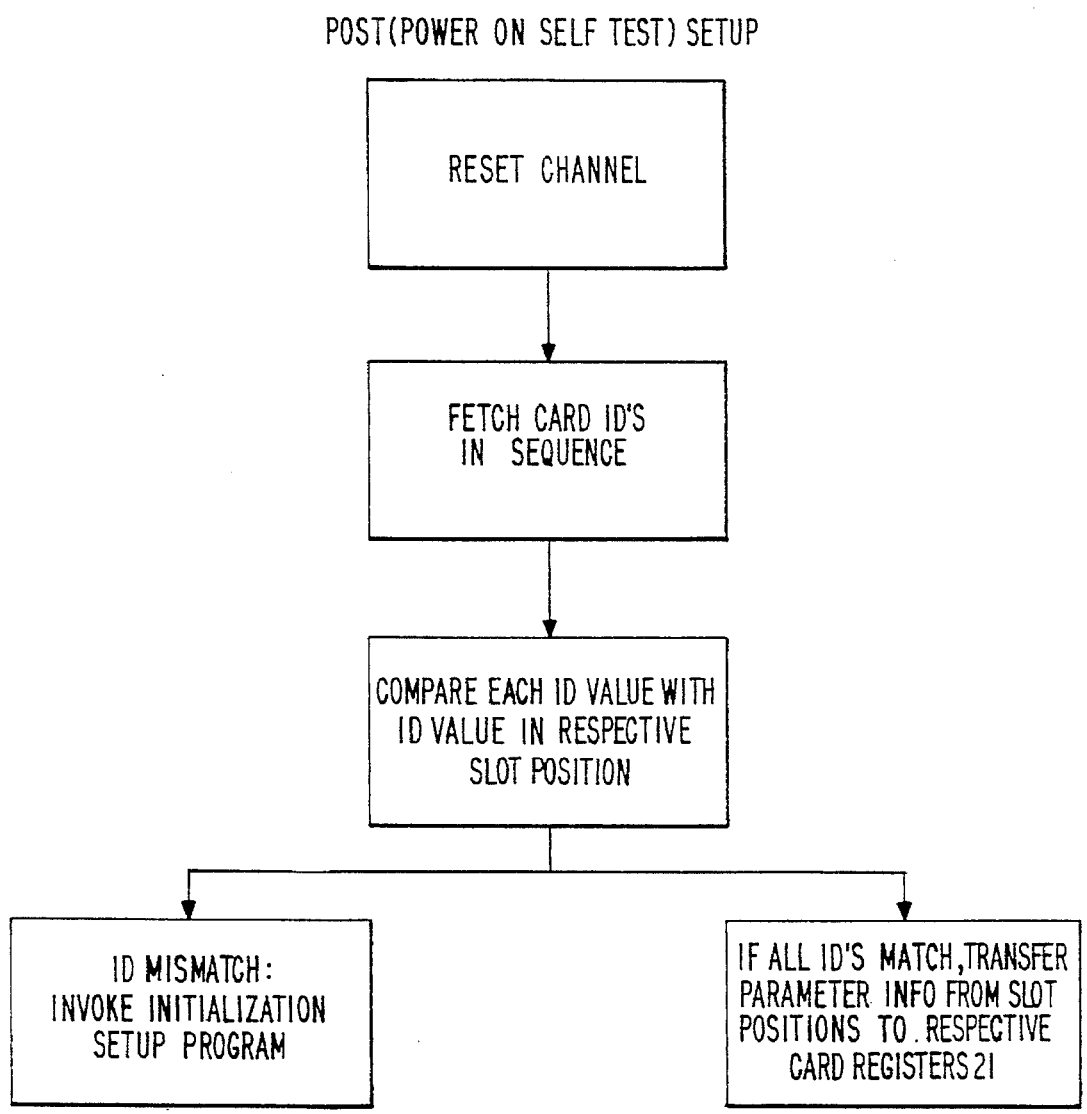

FIG. 3 shows in more detail certain of the logic of the slot address decoder 14 and of the control logic 22 of card 7 which are used in the setup routines of FIGS. 6 and 7. It will be assumed for simplicity of discussion, that addressing of two bytes at a time, i.e., one cycle, is available and that two byte data transfers occurs on busses. Hence, decoding address 101 gates both bytes for addresses 101 and 100.

Slot register 40 is program controlled to store a three bit value (000–111) corresponding to a slot (2-0 to 2-7) to be accessed. A decode circuit 41 changes this three bit binary value to a one in eight line output but only when it is gated by a signal on input line 42. Each output line, such as EC7, is connected via the respective socket to the card held in the socket. When a decode circuit 43 decodes an address in the range 0100–0103 during a setup routine, it produces an output on line 42 to gate the value in 40 to cause an output (see FIG. 4) on a card setup line such EC7, one of the control lines 17a of bus 17.

This output on EC7 is applied to AND gates 44 and 45. The address line A2 is coupled to gates 44 and 45. An I/O read line IOR and an I/O write line IOW (decoded from control lines 17a) are coupled respectively to gates 44 and 45. An output 46 from gate 44 is coupled to a pair of decoder circuits 47 and 48. An output 49 from gate 45 is coupled to a decode circuit 50. An output 51 from decode 48 is coupled to the ID driver circuit 20 and the output 52 from decode 50 is coupled to the parameter register 21.

Figure 4:
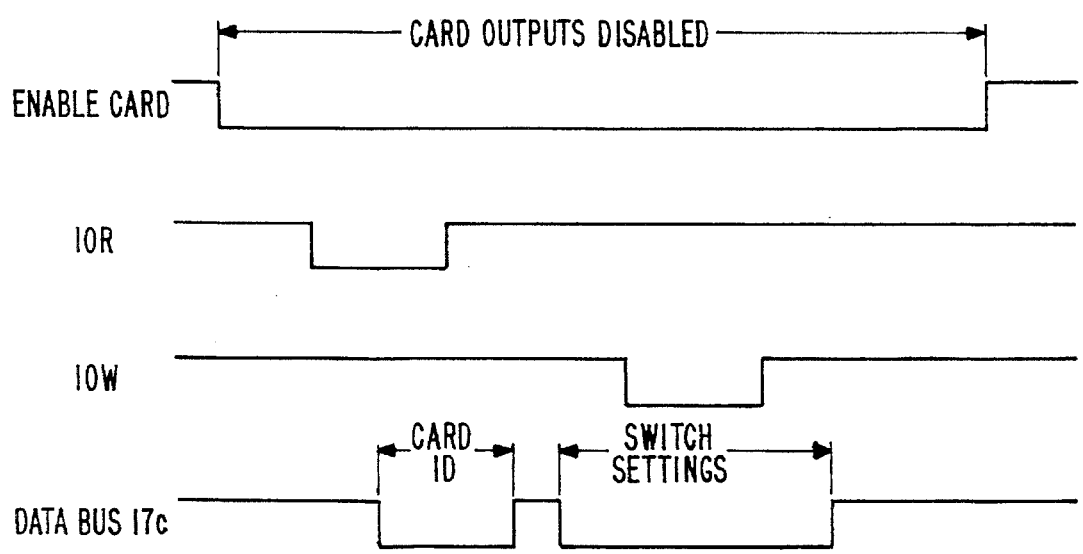
FIG. 4 shows timings for certain of the logic of FIG. 3.

During the post setup routine of FIG. 7, when an ID is being fetched from card 7, the processor 8 forces A2 negative (logical 1) and A1, A0 to logic 01 (address 101). EC7 is negative (FIG. 4). When IOR goes negative, the gate 44 produces an output at 46 to produce an output at 51 which gates the card ID value in 20 to data bus 17c. Processor 8 compares this ID with the ID in the respective slot position in memory module 10. If the IDs compare, processor 8 transfers the parameter values in the slot position 32 (FIG. 1) to data bus 17c and forces A2, A1, A0 to logic 111 (address 103). Shortly thereafter, processor 8 issues an IOW to cause gate 45 to produce an output on 49. This gates an output from 50 to register 21 via line 52 to gate the parameter values on bus 17c into register 21. The output 53 of decode 47 is used during diagnostic routines to gate the output of parameter register 21 to bus 17c via gate 54.

As discussed above with respect to a setup routine, an ID of hexadecimal value FFFF is returned during an ID fetch operation when the addressed socket is empty. One method of achieving this result is shown in FIG. 3. A pre-wired circuit 60 is gated to force bus 17 to all "1's" during the IOR cycle by a negative going signal on any one of the enable card lines EC1 to EC7 via OR circuit 61 and the negative going signal on IOR. If a card is in the socket which has been addressed, its ID is gated to bus 17c at the same time and all logical 0s in the ID override the logical 1s from 60 to correctly reproduce the ID on bus 17c.

The logic of FIG. 3 is used in a similar manner during the initialization setup and the POST setup routines of FIGS. 6 and 7.

When two identical cards (same ID) are connected to two of the I/O slots and it is desired to render both active, the first card is assigned the standard I/O default address at one priority level and the other card is assigned an alternate I/O address at a different priority level.

Figure 5:
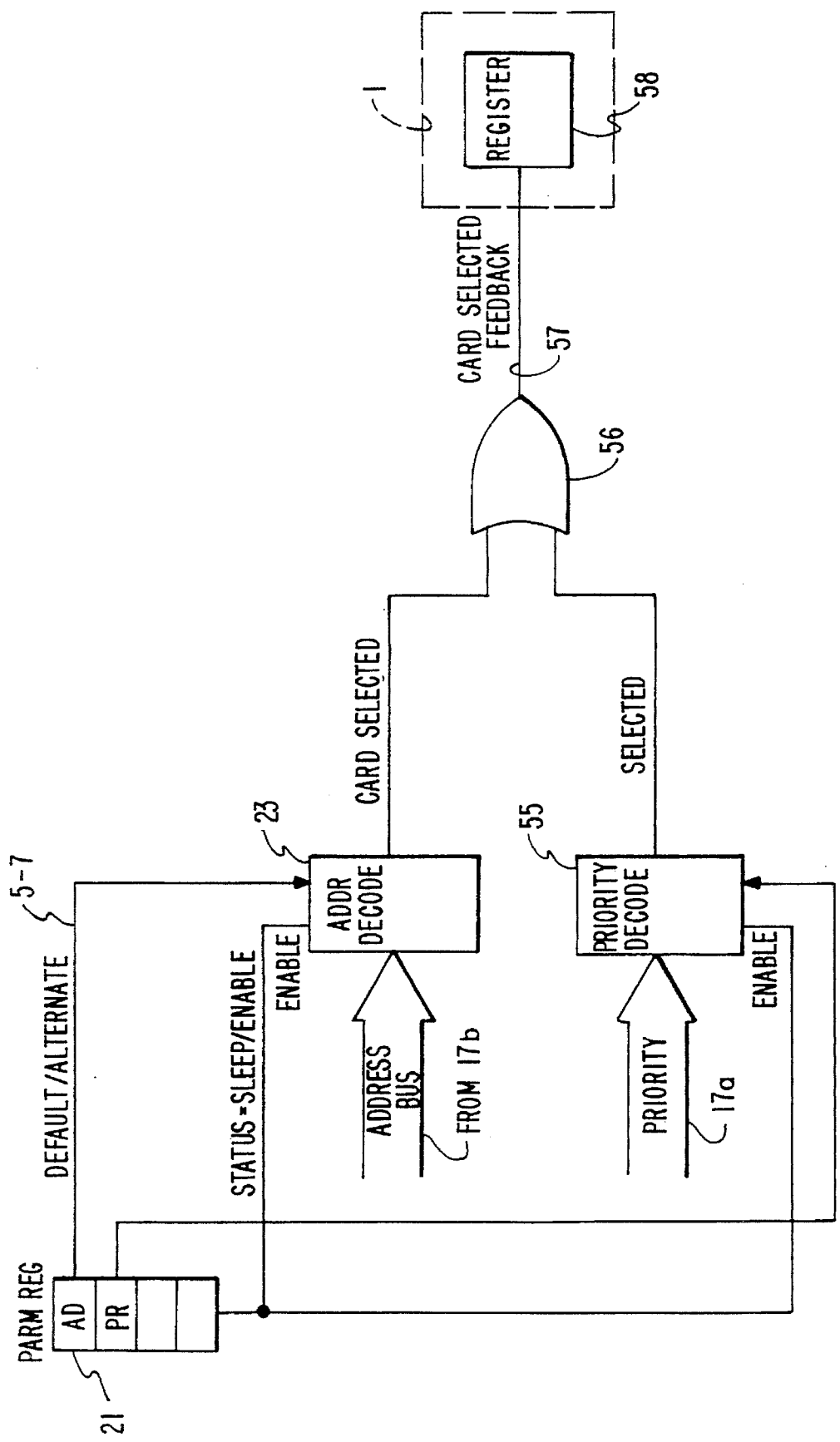
FIG. 5 shows logic utilized by test routines to check the proper selection of an I/O card.

The logic of FIG. 5 is then utilized during a diagnostic routine to ascertain whether each card properly responds to its respective I/O address. The address decode logic 23 decodes the address on bus 17b if it corresponds to the alternate address when the appropriate alternate address factor AD is stored in parameter register 21 and the least significant bit is on (the card is active). Similarly, a priority decode circuit 55 produces an output if the priority value on bus 17a is equal to PR in register 21 and the card active bit is on. If outputs are produced by logic 23 and 55, an AND gate 56 produces a feedback signal on line 57 to set one bit in a register 58 on the board 1. The CPU8 under program control will read register 58 to determine that one and only one card properly responded to the I/O alternate address and reset register 58. Similar circuits on the other identical card will respond to the default I/O address and the appropriate priority level to set another bit in register 58 for diagnostic purposes.

While there have been described what are at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method for operating a computer system to facilitate user transparent establishment of variable system parameters, including addressing for a first configuration of adapter cards attached to said system, wherein each card in said first configuration is of a predetermined card type and has a predefined unique card type ID value associated therewith, and further wherein said system includes a plurality of sockets into which each card in said set of adapter cards may be interchangeable plugged, nonvolatile memory means, coupled to said plurality of sockets, for storing in locations thereof, ID values and parameter information signals pertaining to each of said plurality of sockets and any card plugged into a given socket when the system is powered down, and software-adjustable parameter storage means on each card, coupled to said nonvolatile memory means, utilized in the process of automatically configuring said system on power up to support said first configuration of adapter cards, comprising the steps of:

(a) individually addressing each of said sockets;

(b) determining if a socket is vacant;

(c) terminating further operations relative to any socket determined to be vacant;

(d) conditioning each card attached to a socket to transmit its predefined card type ID value;

(e) determining if said first configuration has changed since the system was last powered down by comparing the transmitted ID value returned by each card attached to any one of said plurality of sockets with the ID value stored in the corresponding memory location in nonvolatile memory for each socket; and (f) transferring, so long as said first configuration has not changed, the parameter information signals stored in said nonvolatile memory means pertaining to each socket and attached card, to the aforesaid parameter storage means on each card to thereby automatically configure said system.

2. A method as set forth in claim 1 further comprising the step of developing parameter information signals associated with a second configuration of peripheral devices attached to said system whenever said first configuration has changed.

3. A method as set forth in claim 1 further comprising the step of assigning a standard I/O default address at one priority level to a first card and an alternate I/O address signal at a different priority level to a second card, whenever said first and second cards are both connected to said plurality of sockets, are both to be activated and both have the same card ID type.

4. A method as set forth in claim 3 further comprising the step of ascertaining whether each card properly responds to its respective I/O address and priority level.

5. A method for initializing and configuring a computer system having a set of peripheral devices attached thereto via a set of adapter cards, wherein each card in said set of adapter cards has a unique card type ID value associated therewith and means for transmitting said ID value located thereon, said computer system including a plurality of sockets into which each card in said set of adapter cards may be interchangeably plugged, nonvolatile memory means, coupled to said plurality of sockets, for storing said card ID values, together with parameter information signals pertaining to said plurality of sockets and any cards plugged therein, in predefined portions of said nonvolatile memory means, where each of said predefined portions is associated with a particular one of said plurality of sockets and software-adjustable parameter storage means, located on each card and coupled to said nonvolatile memory means via said plurality of sockets, used for configuring said system to support said set of peripheral devices, comprising the steps of:

(a) disabling all sockets;

(b) scanning the I/O address space to determine if a non-compatible feature card is attached to said system;

(c) sequentially enabling all sockets so long as no non-compatible feature cards are attached to the system;

(d) sequentially obtaining card ID values, transmitted by said means for transmitting located on each card, for the set of cards plugged into said plurality of sockets;

(e) comparing each ID value obtained with a set of ID values known to the system and, for each ID value known to the system, creating parameter information signals for the card that transmitted the known ID value;

(f) signalling the system user whenever a transmitted card ID value is not known to the system (g) receiving user input parameter information signals pertaining to any card having an ID value unknown to the system;

(h) creating a configuration table from the card ID values obtained and parameter information signals created by the system, together with any parameter information signals received from the user, via steps (d), (e) and (g), and storing said configuration table on a diskette;

(i) storing the parameter information signals and ID values located in said configuration table into said predefined portions of said nonvolatile memory means so that the configuration information for the card attached to a particular socket is stored in the portion of nonvolatile memory associated with said socket; and (j) transferring the parameter information signals stored in said nonvolatile memory means pertaining to each socket and attached card, to the said parameter storage means on each card to thereby initialize and configure said system.

6. A computer system that facilitates user transparent establishment of system resource parameters, including parameters associated with addressing a first configuration of peripheral devices attached to said system via a set of adapter cards which support the operation of said devices, comprising:

(a) a plurality of sockets into which each card in said set of adapter cards may be interchangeably plugged;

(b) nonvolatile memory means having memory locations therein, coupled to said plurality of sockets, for storing parameter information signals pertaining to each of said plurality of sockets in a corresponding memory and any card plugged into a given socket whenever the system is powered down; and (c) software-adjustable parameter storage means, coupled to said nonvolatile memory means, for automatically configuring said system on power up to support said first configuration of peripheral devices.

7. A computer system as set forth in claim 6 wherein each socket in said plurality of sockets is addressable by a physical location socket address signal during system setup.

8. A computer system as set forth in claim 7 wherein any card plugged into a given one of said plurality of sockets is addressable, during normal system operation, by an I/O address signal having a distinctly different value from the socket address signal for said given one of said plurality of sockets.

9. A computer system as set forth in claim 6 wherein said parameter information signals stored in said nonvolatile memory means are used to set said adjustable parameter storage means so long as no change in system peripheral device configuration has occurred since the system was powered down.

10. A computer system as set forth in claim 9 wherein each card in said set of adapter cards is of a predetermined card type and has a predefined unique card type ID value associated therewith.

11. A computer system as set forth in claim 10 wherein said unique card type ID value is hardwired on each card in said set of adapter cards.

12. A computer system as set forth in claim 10 wherein said parameter information signals include an address factor, priority value and state information.

13. A computer system as set forth in claim 12 wherein said software-adjustable parameter storage means further comprise a configuration register on each card in said set of adapter cards.

14. A computer system as set forth in claim 13 which is operative, whenever powered down, to store in said nonvolatile memory means the ID value associated with each card attached to any one of said plurality of sockets, together with the parameter information signals associated with each attached card.

15. A computer system as set forth in claim 14 wherein the ID value and parameter information signals for any card attached to a particular one of said plurality of sockets is stored in a portion of said nonvolatile memory means predefined to be associated with said particular socket.

16. A computer system as set forth in claim 15 further comprising priority card select means, coupled to a plurality of identical card types in said set of adapter cards, for facilitating system operation of said plurality of identical card types at different priority levels depending on the value the parameter information signals set in the adjustable parameter storage means associated with each of said plurality of identical card types.

17. A computer system as set forth in claim 15 further comprising card inactivation means, coupled to a plurality of identical card types in said set of adapter cards, for selectively rendering redundant cards inactive depending on the value the parameter information signals set in the adjustable parameter storage means associated with each of said plurality of identical card types.

18. A computer system as set forth in claim 12 further comprising configuration determination means, coupled to said nonvolatile memory means and each card plugged into any one of said plurality of sockets when the system is powered up for determining if any change to the system configuration was made since the system was last powered down.

19. A computer system as set forth in claim 18 wherein said configuration determination means further comprises:
   (a) ID value determination means for determining, on system power up, the ID value of each card plugged into any one of said plurality of sockets; and
   (b) configuration comparison means, coupled to said ID value determination means, for comparing the card ID value for a card plugged into a particular socket with the ID value stored in the portion of said nonvolatile memory means associated with said particular socket.

20. A computer system as set forth in claim 19 further comprising means for transferring the parameter information signals from the predefined portion of said nonvolatile memory means associated a particular one of said plurality of sockets, to said parameters storage means on the card attached to said particular socket, whenever said configuration determination means determines that no change in system configuration has occurred since the system was last powered down.

21. A computer system as set forth in claim 18 further comprising parameter information signal development means, coupled to said configuration determination means, for developing parameter information signals associated with a second configuration of peripheral devices attached to said system whenever said first configuration has changed.

22. A computer system as set forth in claim 21 wherein said parameter information signal development means further comprises means for transferring said parameter information signals associated with said second configuration of peripheral devices to both said nonvolatile memory means and the parameter storage means on each adapter card supporting said second configuration of peripheral devices.

23. A computer system as set forth in claim 16 further comprising I/O address and assigned priority response determination means, coupled to each card in said set of adapter cards via said plurality of sockets, for determining if each card is properly responding to its I/O address and assigned priority level.

24. A computer system as set forth in claim 23 wherein each card attached to any one of said plurality of sockets, develops a feedback signal in response to an inquiry from said I/O address and assigned priority response determination means, to indicate whether the card is properly responding to its I/O address and assigned priority level.

25. A computer system as set forth in claim 24 further comprising duplicate resource detection means, coupled to each card attached to any one of said plurality of sockets, is responsive to feedback signals provided by each card to detect duplicate use of a selected resource.

26. A computer system with software-adjustable means to automatically configure said system on power up so long as no change in system configuration has occurred since the computer system was powered down, comprising:
   (a) a set of adapter cards, wherein each card in said set is of a predetermined card type and has a predefined unique card type ID value stored thereon;
   (b) a central processing unit (CPU);
   (c) a system bus;
   (d) a plurality of slots into which any card in said set may be plugged;
   (e) slot address decoder means coupled between said system bus and each of said plurality of slots; and
   (f) nonvolatile memory means for storing, in memory locations thereof, parameter information signals pertaining to each of said slots and any card attached to a given slot when the system is powered down.

27. A computer system as set forth in claim 26, wherein each of said adapter cards further comprises:
   (a) driver circuit means, coupled to said system bus via one of said plurality of slots and said slot address decoder means, for transmitting an identity value which uniquely identifies card type and associated peripheral device;
   (b) parameter storage means for storing parameter information signals used to control communications between a given card and said system bus; and
   (c) logic means, coupled to said parameter storage means and to said system bus via said one of said plurality of slots and said slot address decoder means, for controlling card response to I/O addresses appearing on said system bus.

28. A computer system as set forth in claim 27 wherein said parameter information signals include an address factor priority value and state information.

29. A computer system as set forth in claim 28 wherein said logic means further comprises decoder logic means, operating under the control of the address factor stored in said parameter storage means, for detecting an I/O address uniquely associated with card type.

30. A computer system as set forth in claim 29 wherein said logic means further comprises control means, including driver enable means, for enabling said driver circuit means, in response to a request appearing on said system bus from said CPU, to transmit said identity value.

31. A computer system as set forth in claim 30 wherein said control means further comprises card programming means, coupled to said system bus via said one of said plurality of slots and said slot address decoder means, for transferring parameter information signals associated with said one of said plurality of slots, retrieved from memory locations in said nonvolatile memory means and placed on said system bus by said CPU, to said parameter storage means in response to first control signal initiated by and placed on said system bus by said CPU.

32. A computer system as set forth in claim 30 wherein said control means further comprises parameter storage readout means, coupled to said system bus via said one of said plurality of slots and said slot address decoder means, for outputting the parameter information signals stored in said parameter storage means to said system bus in response to a second control signal initiated by and placed on said system bus by said CPU.

33. A computer system as set forth in claim 29 further comprising diagnostic support means, for generating a feedback signal to indicate, in response to a diagnostic program executing on said system, whether said card is properly responding to its I/O address and any assigned priority level.

34. A computer system as set forth in claim 33 wherein said diagnostic support means includes said address decoder means and further comprises priority decode means, coupled to said parameter storage means, for comparing the priority of the card selected by said diagnostic program with the priority value stored in said parameter storage means.

35. A computer system as set forth in claim 34 wherein said diagnostic support means further comprises gate means for developing said feedback signal as a function of output signals generated by said address decoder means and said priority decode means.

36. A computer system including a set of adapter cards, wherein each card is identifiable as to card type by a unique predefined ID value stored thereon, comprising:
   (a) a central processing unit (CPU);
   (b) a system bus;

(c) a plurality of slots into which any card in said set may be plugged;

(d) slot address decoder means coupled between said system bus and each of said plurality of slots; and (e) nonvolatile memory means for storing, in memory locations thereof, parameter information signals pertaining to each of said slots and any card attached to a given slot when the system is powered down, said parameter information signals further including an ID value for each card attached;

(f) means coupled to said slots and said nonvolatile memory means effective after power-up following the system power-down for comparing the ID value stored in a memory location of the nonvolatile memory means to the predefined ID value of each card attached to said slots; and (g) means for configuring a card attached to said slots if the ID value in said nonvolatile memory means does not match the predefined ID value on said card.

37. A computer system that facilitates user transparent establishment of variable system parameters, including parameters associated with addressing a first configuration of a set of adapter cards, each of which has a unique card type ID value associated therewith and means for transmitting said ID value located thereon, that support the operation of said devices, comprising:

(a) a plurality of sockets into which each card in said set of adapter cards may be interchangeably plugged;

(b) nonvolatile memory means, coupled to said plurality of sockets, for storing said card ID values, together with parameter information signals pertaining to said plurality of sockets and any cards plugged therein, in predefined portions of said nonvolatile memory means, where each of said predefined portions is associated with a particular one of said plurality of sockets;

(c) software-adjustable parameter storage means, located on each card in said set of adapter cards and coupled to said nonvolatile memory means via said plurality of sockets, used for automatically configuring said system on power up to support said first configuration of a set of adapter cards; and (d) first system configuration means, coupled to said nonvolatile memory and to each adapter card via said plurality of sockets, for automatically transferring the parameter information signals from the predefined portion of said nonvolatile memory means associated with a particular one of said plurality of sockets, to said software-adjustable parameter storage means on the card attached to said particular socket, so long as no change in system configuration has occurred since the system was last powered down.

38. A computer system as set forth in claim 37 wherein said first system configuration means further comprises:

(a) first means for sequentially obtaining card ID values, transmitted by said means for transmitting located on each card, from the set of cards plugged into said plurality of sockets;

(b) means for determining if said first configuration has changed since the system was last powered down by comparing the transmitted ID value obtained from each card attached to any one of said plurality of sockets with the ID value stored in nonvolatile memory for each socket; and (c) means for transferring, so long as said first configuration has not changed, the parameter information signals stored in said nonvolatile memory means pertaining to each socket and attached card, to the aforesaid parameter storage means on each card to thereby automatically configure said system.

39. A computer system as set forth in claim 37 further comprising second system configuration means, coupled to said nonvolatile memory and to each adapter card via said plurality of sockets, for initializing and setting up said system whenever a change in system configuration has occurred since the system was last powered down.

40. A computer system as set forth in claim 39 wherein said second system configuration means further comprises:

(a) means for disabling all sockets;

(b) means for performing I/O address space scanning, coupled to said plurality of sockets, to determine if a non-compatible feature card is attached to said system;

(c) means for sequentially enabling all sockets so long as no non-compatible feature cards are attached to the system;

(d) second means for sequentially obtaining card ID values, transmitted by said means for transmitting located on each card, for the set of cards plugged into said plurality of sockets;

(e) means for comparing each ID value obtained with a set of ID values known to the system and, for each ID value known to the system, creating parameter information signals for the card that transmitted the known ID value;

(f) user interface means, coupled to said means for comparing, for signalling the system user whenever a transmitted card ID value is not known to the system, and for providing a means by which said user can input parameter information signals pertaining to any such card;

(g) means for creating a configuration table from the card ID values obtained and parameter information signals created by the system, together with any parameter information signals provided by the user and storing said configuration table on a reference diskette;

(h) means for storing the parameter information signals and ID values located in said configuration table into said predefined portions of said nonvolatile memory means so that the configuration information for the card attached to a particular socket is stored in the portion of nonvolatile memory associated with said socket; and (h) means for transferring the parameter information signals stored in said nonvolatile memory means pertaining to each socket and attached card, to the said parameter storage means on each card to thereby configure said system.

41. A computer system as set forth in claim 40 wherein said user interface means further comprises parameter information signal conflict resolution means that enable the system user to resolve parameter conflicts.

42. A computer system, including at least one adapter card having a unique card type ID value associated therewith and means for transmitting said ID value located thereon, comprising:

(a) a socket into which a said card may be plugged;

(b) nonvolatile memory means, coupled to said socket, for storing said card ID value, together with configuration information pertaining to said socket and the card plugged therein, in a predefined portion of said nonvolatile memory means associated with said socket;

(c) software-programmable parameter storage means, located on said card and coupled to said nonvolatile memory means via said socket; and (d) configuration means, coupled to said nonvolatile memory and said adapter card via said socket, for automatically transferring the configuration information from said predefined portion of said nonvolatile memory means, to said software-adjustable parameter storage means, to thereby automatically set said parameter storage means, so long as no change in system configuration has occurred since the system was last powered down.

43. A device card for a central processing system, the central processing system having an I/O socket for attaching said device card to the central processing system, a bus for electrically connecting said card to the central processing system, a central processor unit, and a nonvolatile memory, the nonvolatile memory including a first identity value associated with said device card, the nonvolatile memory further including corresponding parameter data for said card, the parameter data being representative of variable system resource information to enable said card to operate within the central processing system, said device card comprising:

storage means provided on said card for permanently storing a second identity value for indicating a respective card type;

decoding means for decoding on said card, said decoding means being responsive to a first control signal initiated from the central processing unit for effecting the transfer of the second identity value to the central processing unit, a driver circuit means responsive to said decoding means for transmitting the second identity value to the central processing system, wherein the central processing unit generates a second control signal when the second identity value of said card then connected to the central processing system matches the first identity value stored in the nonvolatile memory, the central processing unit further transferring the parameter data to the bus upon a successful comparison of said identity values;

card programming means for transferring the parameter data from said bus to said card in response to the second control signal initiated from the central processing unit; and parameter storage means provided on said card for storing the parameter data from the central processing unit.

44. The device card of claim 43, wherein said parameter storage means comprises a register means coupled to said card.

45. The device card of claim 43, wherein the parameter data includes an address factor for providing an I/O address uniquely associated with said card, said card further including a control means, coupled to said parameter storage means, for detecting the presence of the I/O address, uniquely associated with said card, to enable said card to receive information from the central processing unit.

46. The device card of claim 43, wherein the parameter data includes a priority value and said card includes a priority card select means for permitting said card to be selected over another card on the basis of priority.

47. The device card of claim 43 further including a feedback line connected to said card, said feedback line further being connected to said central processing unit; and means on said card, responsive to a unique card select input signal from the central processing unit, for selectively sending a signal on said feedback line to said central processing unit indicating selection of said card.

48. A data processing system comprising;

a system board having a plurality of I/O sockets thereon, said plurality of I/O sockets being adapted for attachment of peripheral control cards of various types having identity values corresponding to the card stored on the card, nonvolatile memory for storing, in locations thereof assigned to respective I/O sockets, the identity values of cards attached to said I/O sockets when power was last applied to said system, a comparator effective after power has been removed from and reapplied to said system for comparing the identity value on the cards with the identity value stored in the respective memory location to determine if any cards have been added, changed or moved since the previous removal of power from said system; and, a processor responsive to outputs of said comparator for indicating successful comparisons of identity values for transferring and storing into each respective card, parameter data stored in the respective memory location, thereby eliminating the need to create the parameter data.

* * * * *